United States Patent [19]

Randolph

[11] Patent Number: 4,676,352

[45] Date of Patent: Jun. 30, 1987

[54] COMBINATION GEAR DRIVE WITH IMPROVED CLUTCH ASSEMBLY

[76] Inventor: Troy D. Randolph, Rte. 2, Box 140, 9405 N. Quaker, Lubbock, Tex. 79415

[21] Appl. No.: 712,543

[22] Filed: Mar. 15, 1985

[51] Int. Cl.⁴ .................. F16D 67/02; F16D 11/00
[52] U.S. Cl. .................................. 192/8 R; 74/661; 192/12 B; 192/46; 192/67 P; 192/108; 192/148
[58] Field of Search ............ 192/8 R, 12 B, 18 R, 192/15, 46, 67 P, 108, 148; 74/661; 188/82.9

[56] References Cited

U.S. PATENT DOCUMENTS

| | | | |
|---|---|---|---|
| 615,614 | 12/1898 | Flood | 192/46 |
| 2,944,440 | 7/1960 | Pamphilon | 74/661 |
| 3,417,636 | 12/1968 | Randolph . | |
| 3,550,727 | 12/1970 | McCain | 192/8 R X |
| 3,572,482 | 3/1971 | Kalpas et al. | 192/15 |
| 3,667,578 | 6/1972 | Johnson | 192/8 R |

OTHER PUBLICATIONS

Amarillo Right Angle Gear Drives Catalog No. 30 Mar. 1981.
Johnson Gear Bulletin JG-81.
Randolph Manufacturing Co. Catalog PC-82.

Primary Examiner—Rodney M. Bonck
Attorney, Agent, or Firm—Litman, McMahon & Brown

[57] ABSTRACT

A combination, right angle gear drive including a clutch assembly with a drive clutch mechanism and a non-reverse clutch mechanism. The gear drive has a top-mounted motor stand for a primary power source and a horizontal drive shaft adapted for coupling to a backup power source. The drive clutch automatically engages upon activation of the backup power source and automatically disengages when the primary power source beings operation. The non-reverse clutch mechanism blocks reverse rotation of the gear drive.

19 Claims, 5 Drawing Figures

COMBINATION GEAR DRIVE WITH IMPROVED CLUTCH ASSEMBLY

BACKGROUND OF THE INVENTION

1. Field of the Invention.

The present invention relates generally to gear drives and in particular to a combination gear drive with a clutch assembly including drive and non-reverse clutch mechanisms.

2. Description of the Prior Art.

Gear drives are well known in the art and a variety of designs have heretofore been proposed for various applications. For example, right angle gear drives are often employed with above-ground engines for driving vertical shafts connected to below-ground pumps. Such arrangements are commonly found in irrigation, petroleum production and various civil and sanitary pumping installations. An exemplary right angle gear drive interconnecting an engine and a deep well pump is shown in U.S. Pat. No. 3,417,636 to T. D. Randolph for HEAT TRANSFER APPARATUS.

In certain applications, continuous operation is required and a backup or auxiliary engine or motor may be coupled to the gear drive. A common arrangement includes an electric motor for normal operation with a gasoline or diesel engine as a backup. Automatic control systems may be provided which start the backup engine in response to a loss of power to the primary motor.

Such gear drives with multiple inputs are referred to as combination drives. Typical applications include storm drainage pumps for tunnels and underpasses, sewage lift stations, municipal water supply systems and pumps for fire fighting equipment.

Combination gear drives are generally provided with clutch mechanisms for disengaging the backup engine during normal operation. For example, manual clutches are provided in many combination drives. However, they require the presence of an operator to make the conversion from normal to backup operation, which may require the partial disassembly and modification of the combination drive unit to engage the clutch.

Most combination gear drives also require non-reverse mechanisms to prevent backwards rotation of the pumps driven thereby. Otherwise liquid upstream of the pump would tend to rotate it backwards when the motor or engine is stopped. Such backwards rotation can damage the impeller and other parts of the pump, and if sufficiently forceful can lift the pump and gear drive off of their mountings. This problem is most severe in deep hole applications where a substantial head of liquid accumulates over the pump.

Transmission-type clutches with sprag non-reverse mechanisms have heretofore been employed in gear drives. Such clutches allow slippage in one direction, for example, when the gear drive is operating, but prevent movement in the opposite direction. However, the sprags are subjected to considerable sliding friction and thus have relatively short operating lives, even when lubricated with transmission fluid or the like. Furthermore, lubrication systems for the sprags tend to add complexity and expense to the gear drives, and if the clutch lubrication system malfunctions, damage can result in a relatively short time.

Heretofore, there has not been available a combination gear drive with drive and non-reverse clutches having the advantages and features of the present invention.

SUMMARY OF THE INVENTION

In the practice of the present invention, a right angle, combination gear drive is provided which includes a top-mounted motor stand adapted to receive a primary power source comprising, for example, an electric motor. The electric motor is coupled to a clutch plate and may include a motor shaft extending through a vertical drive shaft of the gear drive to a driven pump or the like. The gear drive includes a horizontal drive shaft adapted for coupling to a backup power source, for example an internal combustion engine. A clutch assembly includes a drive clutch and a non-reverse clutch. The drive clutch automatically engages when the backup power source starts and disengages when the primary power source is actuated.

OBJECTS OF THE INVENTION

The principle objects of the present invention are: to provide a combination gear drive with multiple inputs; to provide such a gear drive which is adapted for operation with primary and backup power sources; to provide such a gear drive which is particularly adapted for use with an electric motor as a primary power source and an internal combustion engine as a backup power source; to provide such a gear drive which is adapted for automatic conversion to the backup power source; to provide such a gear drive which includes a clutch mechanism for disengaging the backup power source during normal operation with the primary power source; to provide such a gear drive wherein the drive clutch is automatically actuated by the backup power source; to provide such a gear drive which includes a non-reverse clutch adapted for preventing backwards rotation of a driven shaft when the primary or backup power sources stop; to provide such a gear drive which includes a pair of upper ball bearing assemblies for a drive shaft; to provide such a gear drive which is adaptable for air and/or water cooling; and to provide such a gear drive which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
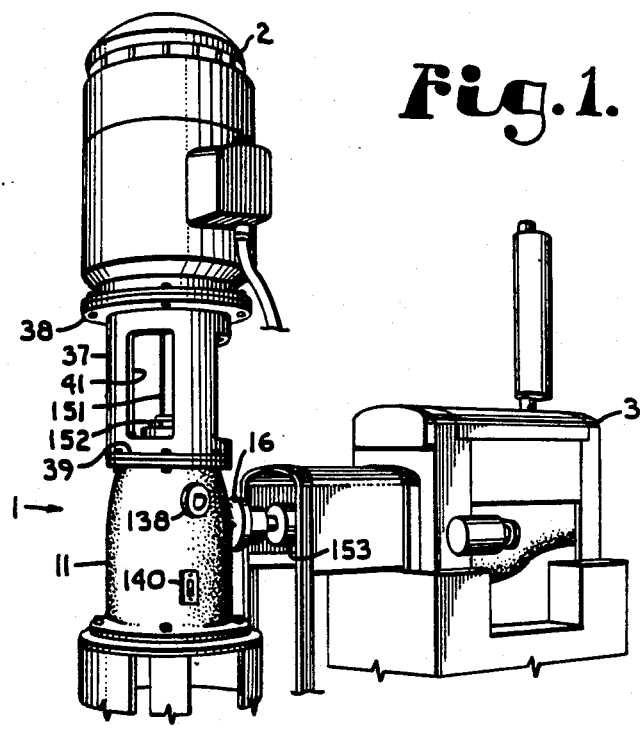
FIG. 1 is a perspective of a gear drive embodying the present invention coupled to an electric motor as a primary power source and an internal combustion engine as a backup power source.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a combination right angle gear drive embodying the present invention. An electric motor 2 is mounted on top of the gear drive 1 as a primary power source therefor. An internal combustion engine 3 is coupled to the gear drive 1 as a backup power source and may comprise, for example, a diesel or gasoline engine.

The gear drive 1 includes a main case 11 with a centrally disposed, lower opening 12 receiving a center plug 13 with a center plug aperture 14. A lower ball bearing assembly 21 is positioned within the main case lower opening 12 above the center plug 13 and includes ball bearings 22. The main case 11 also includes a side opening 15 adapted to receive a horizontal bearing carrier 16 thereover. The horizontal bearing carrier 25 receives inboard and outboard roller bearing assemblies 17, 18 respectively. An oil seal retainer 19 is mounted on the outboard end of the horizontal bearing carrier 16 over the outboard roller bearing assembly 18 and receives an oil seal 20.

The main case 11 further includes an upper opening 24 which receives a thrust bearing carrier 25 with upper and lower thrust bearing assemblies 26, 27 having taper bearings 28. A motor stand 37 with upper and lower mounting flanges 38, 39 is attached to the main case 11 on top of the thrust bearing carrier 25 by mounting bolts 40 which extend through the lower mounting flange 39, the thrust bearing carrier 25 and into the main case 11 around its upper opening 24. The motor stand 37 includes a pair of diametrically opposed side openings 41.

A vertical drive shaft 51 is centrally disposed within the gear drive 1 and includes upper and lower threaded ends 52, 53 and a coaxial bore 54 with an enlarged bore lower end 55. The drive shaft ends 52, 53 are journalled within the thrust bearing assemblies 26, 27. The vertical drive shaft 51 includes a longitudinally-extending keyway 56.

A horizontal drive shaft 61 includes inboard and outboard ends 62, 63 and is journalled in the inboard and outboard roller bearing assemblies 17, 18. The horizontal drive shaft outboard end 63 threadably receives a lock nut 64 and extends through the oil seal 20. The horizontal drive shaft inboard end 62 receives a spiral bevelled pinion 67 which intermeshes with a corresponding spiral bevelled gear 68 mounted on the vertical drive shaft 51 below the thrust bearing assemblies 26, 27 by a gear key 69 received in the keyway 56. Rotary motion of the horizontal drive 61 is imparted to the vertical drive shaft 51 by the pinion and gear 67, 68.

A clutch assembly 73 is mounted within the motor stand 37 on the vertical drive shaft upper end 52 and includes a non-reverse plate 75 bolted on top of the thrust bearing carrier 25 by bolts 76. The non-reverse plate 75 includes a coaxial, centrally disposed opening 77 and an annular upper edge 78. A plurality of non-reverse notches 79 are formed in the plate 75 and are open at its upper edge 78. Each notch 79 includes a vertical face 80 and a ramp 81 which slopes upwardly from the vertical face 80 to the plate upper edge 78 in a counterclockwise direction when viewed from the top. Preferably, the non-reverse plate 75 includes an odd number of five or more notches 79 for purposes which will be explained more fully hereinafter.

A drive block 85 includes a lower portion 86 rotatably received within the non-reverse plate opening 77 and having a drive block lower opening 87 which receives the vertical drive shaft 51 and is secured thereto by a drive block key 88.

The drive block 85 also includes an upper portion 91 with an annular, coaxial counterbore 92 and an upper edge 93. The drive block upper edge 93 has a plurality of notches 94 each having a vertical face 95 and a ramp 96. The ramps 96 extend from the vertical faces 95 in a counterclockwise direction along an upward slope to the drive block upper edge 93. By way of example, four notches 94 are provided in the drive block upper portion 91. The drive block upper portion 91 includes a coaxial, annular lower edge 97 in opposed relation to the non-reverse plate upper edge 78 and a plurality (for example, four) of nonreverse pin receivers 98 extending thereinto and open downwardly at the lower edge 97. Each receiver 98 receives a respective non-reverse pin 99.

A bearing hub 108 includes a coaxial opening 109 adapted to receive upper and lower clutch ball bearing assemblies 110, 111 which are journalled on the vertical drive shaft upper end 52 and include respective ball bearings 112. A pair of annular bearing spacers 113 are placed over the vertical drive shaft upper end 52 between the lower ball bearing assembly 111 and the drive block lower portion 86 and between the ball bearing assemblies 110, 111 respectively. A locknut 120 is threadably received on the vertical drive shaft upper end 52 over the upper ball bearing assembly 110.

The bearing hub 108 includes a lower portion received within the drive block upper portion 91 and an upper portion 114 having upper and lower annular edges 115, 116. The bearing hub lower edge 116 is in opposed relation to the drive block upper edge 93. A plurality of drive pin receivers 117 extend into the bearing hub upper portion 114 and are open downwardly at the lower edge 116 thereof. For example, four drive pin receivers 117 may be provided at 90° radial intervals. Each drive pin receiver 117 receives a respective drive pin 118 and a helical drive spring 119 adapted to bias the drive pin 118 downwardly into engagement with the drive block upper edge 93. A grease fitting or zerk is provided in the bearing hub upper portion 114 whereby lubricating grease may be injected into the bearing assemblies 110, 111.

A clutch plate 123 is mounted on top of the bearing hub 108 by bolts 24 and includes a coaxial bore 125 aligned with the vertical drive shaft bore 54 and having a longitudinally-extending keyway 126.

A lubrication system 130 is provided which includes a centrifugal-type oil pump 132 threadably mounted on the drive shaft lower end 53 within a tubular oil pump enclosure 131 estending upwardly from around the main case lowering opening 12. A manifold 133 is connected to the oil pump 132 by a conduit 134 mounted on the oil pump enclosure 131 and divides the output of the pump 132 into three streams. A first oil tube 135 communicates oil from the manifold 133 through the thrust bearing carrier 25 to the thrust bearings 26, 27. A second oil tube 136 communicates oil from the manifold 133 to the pinion and gear 67, 68. A third oil tube 137 communicates oil from the oil pump 132 into the horizontal bearing carrier 16 for lubricating the bearing assemblies 17, 18.

An oil fill plug 138 is provided for placing oil in a reservoir 139 formed by the main case 11 and a sight gauge 140 communicates with the reservoir 139 so that the level of oil therein may be observed from the outside of the gear drive 1. A reservoir stand pipe 141 is received in the center plug aperture 14 and is inserted into the enlarged lower end 55 of the vertical drive shaft bore 54. The stand pipe 141 terminates at a level above the normal oil level within the reservoir 139 so that oil is prevented from escaping from the gear drive 1 through the center plug aperture 14. An oil supply aperture 142 extends through the bottom of the oil pump enclosure 131 for admitting oil from the reservoir 139 to the oil pump 132. An oil return vent 143 extends through the vertical drive shaft lower end 53 above the normal oil level within the reservoir 139 and returns oil from the inside of the vertical drive shaft bore 54 to the reservoir 139.

A water cooling system 145 is provided which includes tubing coils 146 within the reservoir 139 communicating with inlet and outlet fittings (not shown) in the main case 11.

In operation, an electric motor 2 is mounted on the motor stand 37 and connected to the clutch plate 123 by a motor shaft 151 including a coupling 152. The motor shaft 151 has a diameter slightly less than the vertical drive shaft bore 54 whereby it is free to rotate therein. The backup engine 3 is connected to the horizontal drive shaft 61 by an engine coupling 153. A suitable automatic control system (not shown) may be provided for automatically starting the engine 3 when the motor 2 stops, for example, in the event of a power failure.

The motor shaft 151 extends through the stand pipe 141 and downwardly from the gear drive 1 to, for example, a driven submersible pump located within a well hole. The entire weight of the driven pump and the motor shaft 151 connected thereto may be suspended from the motor 2, which of course would include thrust bearings sized to accommodate such a load.

Figure 4:
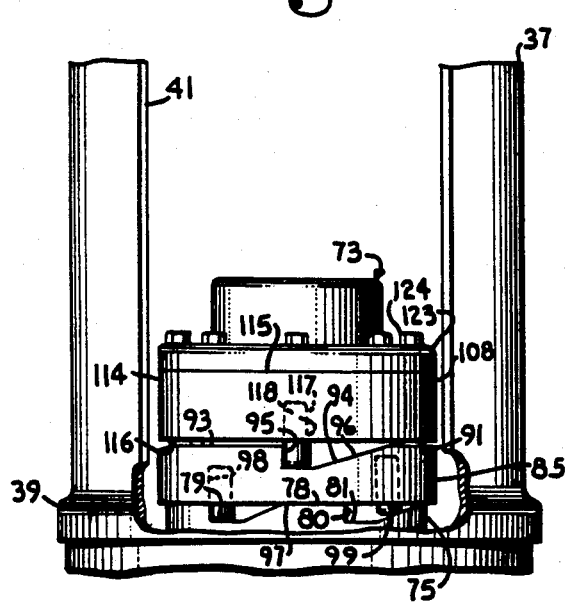
FIG. 4 is an enlarged elevation of the gear drive particularly showing the drive and non-reverse clutches thereof.

When the electric motor 2 is started for normal operation, a rotary motion in a counterclockwise direction when viewed from the top is imparted to the clutch plate 123 and the bearing hub 108. The drive pins 118, which are in their lower, extended positions as shown in FIG. 4 slide along respective ramps 96 to retracted positions whereby the helical springs 119 are compressed and the lower ends of the drive pin 118 are substantially flush with the bearing hub lower edge 116. The centrifugal force of the rotation of the bearing hub 108 retains the drive pins 118 in their upper, retracted positions as long as the motor 2 continues to rotate at a sufficient speed.

During normal operation with the electric motor 2, the vertical drive shaft 51, the drive block 85 and the horizontal drive shaft 61 are all substantially motionless. When the electric motor stops, the centrifugal force on the drive pins 118 is relieved proportional to the speed decrease and the drive pins 118 are biased downwardly by springs 119 from their respective receivers 117. At relatively slow rotational speeds, the drive pins 118 will ratchet over the notches 94 and along the drive block upper edge 93.

With the electric motor 2 stopped, the engine 3 may be started manually or by a suitable automatic control system (not shown) to continue operation of the driven pump. When the engine 3 starts, rotary motion is imparted to the vertical drive shaft 51 from the horizontal drive shaft 61 by the pinion and gear 67, 68. The drive block 85 rotates with the vertical drive shaft 51 and the non-reverse pins 99 ratchet over the non-reverse plate upper edge 78 until they are retained by centrifugal force within their respective receivers 98 in the same manner as the drive pins 118. The drive pins 118, on the other hand, are in their lowered, extended positions and engage the vertical faces 95 of respective notches 94 whereby the bearing hub 108, the clutch plate 123 and the motor shaft 151 are all set in rotation. The motor 2 is designed for unpowered rotation and rotates freely when the engine 3 is employed as a backup power source.

The clutch assembly 73 is designed to prevent reverse rotation of both the vertical drive shaft 51 (and hence the engine 3) and the electric motor 2. Such reverse rotation might otherwise be caused by a stoppage of either the motor 2 or the engine 3 with a substantial head of fluid above the submersible pump, which flows downwards through the pump and imparts a reverse rotational force on its impeller. If left unchecked, this reverse rotational force could cause the gear drive 1, the motor 2 and the engine 3 to turn backwards and result in damage to the pump or other parts of the system. Furthermore, the forces associated with such a reverse rotation might tend to raise the submersible pump out of its drill hole and lift the gear drive 1 off of its mountings. Of course, this problem is more acute with deeper drill holes.

When both the motor 2 and the engine 3 are stopped, the drive pins 118 engage respective vertical faces 95 whereby the reverse rotational force is imparted to the drive block 85, which rotates in reverse until the first non-reverse pin 99 engages a vertical face 80 on the non-reverse plate 75. Preferably four non-reverse pins 99 are provided at 90° intervals in conjunction with five or more non-reverse notches 79 at 72° intervals so that the maximum reverse rotation of the drive block 85 is relatively limited. As soon as the first non-reverse pin 99 engages a non-reverse plate vertical face 80, reverse rotation is halted. Of course, when either the motor 2 or the engine 3 resumes operation, the drive pins 118 or the non-reverse pins 99 are retracted in the manner described hereinbefore.

The relatively limited reverse rotation permitted by the clutch assembly 73 will prevent damage to the system under most conditions and is sufficient to lock the gear drive 1 against reverse rotation while the fluid head dissipates under gravity. However, the pins 99, 118 are readily retracted to their disengaged positions by centrifugal force when either of the motor end engine 2, 3 resumes operation. Furthermore, in normal operation the clutch assembly 73 contributes relatively little antirotational friction to the operation of the gear drive 1 since the pins 99 and 118 are withdrawn from substantial contact with the non-reverse plate upper edge 78 and the drive block upper edge 93 respectively.

Figure 5:
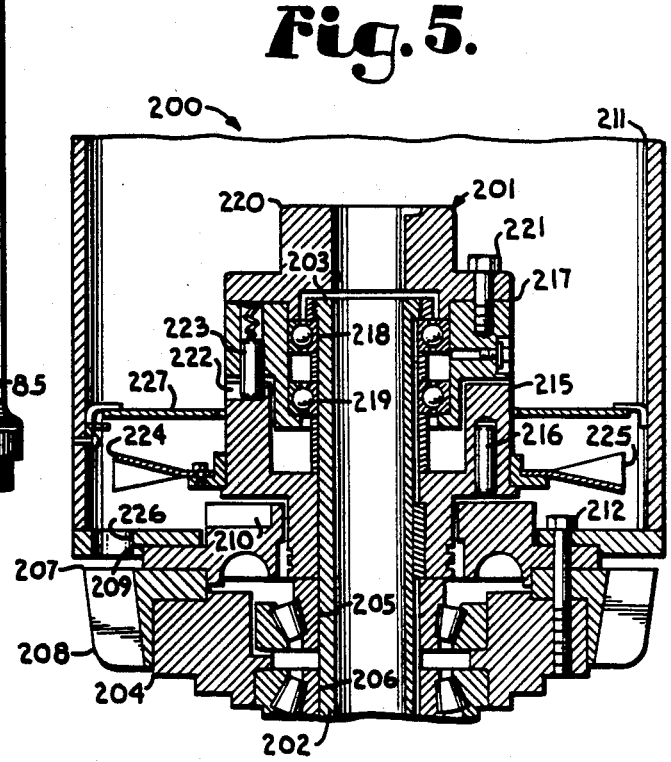
FIG. 5 is a fragmentary cross-section of a fan-cooled gear drive comprising a modified embodiment of the present invention.
Figure 3:
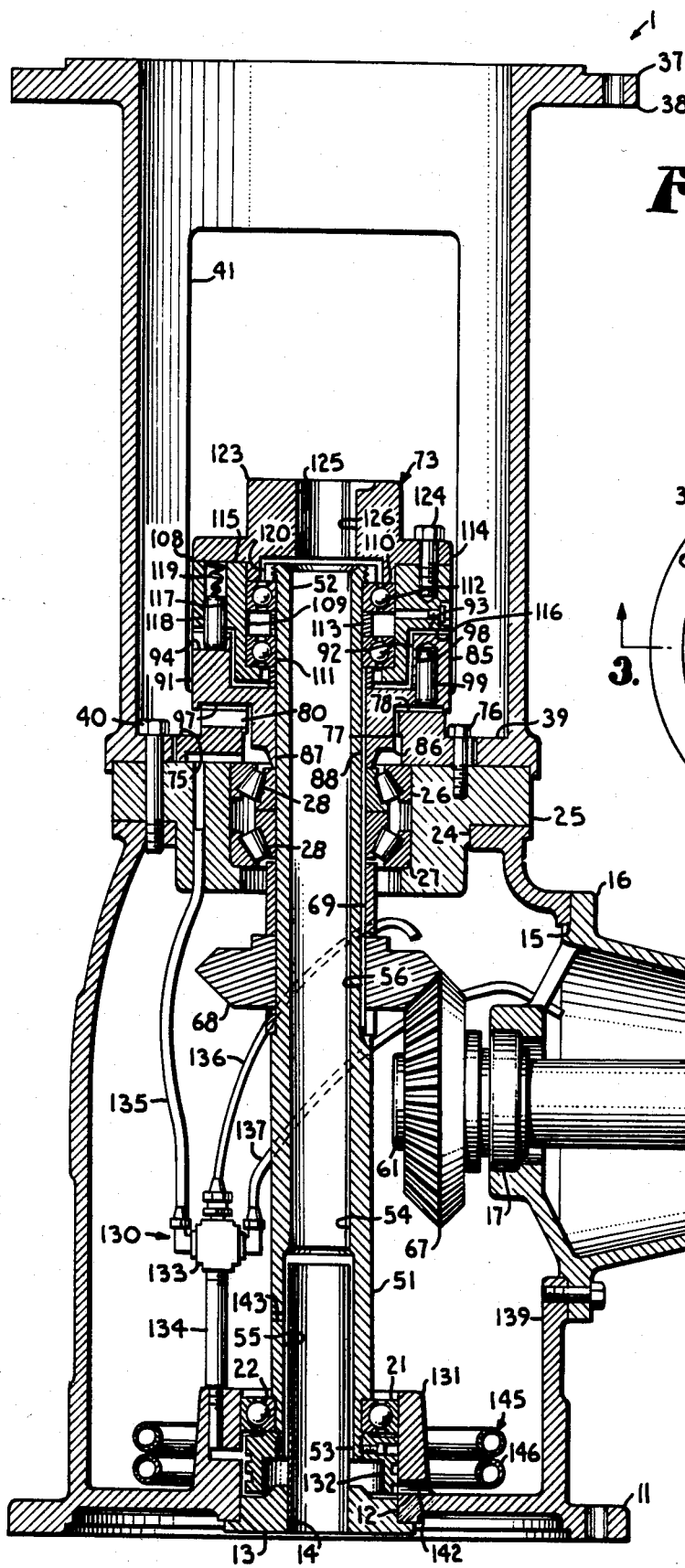
FIG. 3 is a cross-section of the gear drive taken generally along line 3—3 in FIG. 2.
Figure 2:
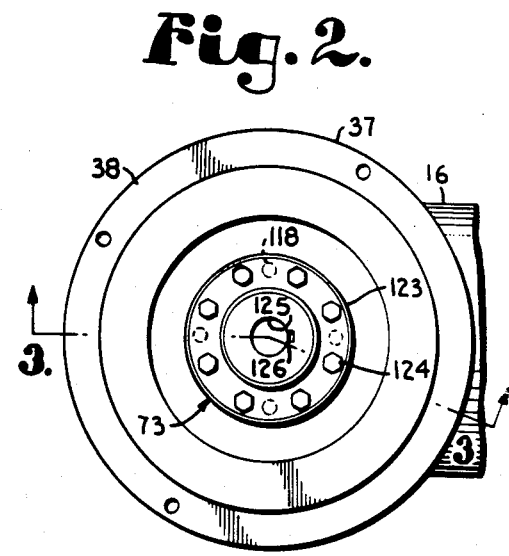
FIG. 2 is a top plan of the gear drive.

A fan-cooled right angle gear drive comprising a first modified embodiment of the present invention is generally designated by the reference numeral 200 and is shown in FIG. 5. The gear drive 200 includes a drive and non-reverse clutch assembly 201 which operates in substantially the same manner as the clutch assembly 73. A thrust bearing carrier 204 receives upper and lower thrust bearing assemblies 205, 206. A drive shaft 202 with an upper end 203 is journalled in the bearing assemblies 205, 206. A heat exchanger 207 with radially-extending fins 208 is mounted on the thrust bearing carrier 204 in a heat conductive relationship therewith. The heat exchanger 207 preferably comprises a material with a high coefficient of thermal conductivity, for example, aluminum. The fins 208 communicate with the ambient atmosphere outside of the gear drive 201.

A non-reverse plate 209 is mounted on the heat exchanger 207 and includes a plurality of notches 210 similar to the notches 79 described in connection with the gear drive 1. A motor stand 211 is bolted to the nonreverse plate 209 by bolts 212 that extend through the motor stand 211, the non-reverse plate 209, the heat exchanger 207, the thrust bearing carrier 204 and into a case (not shown).

A drive block 215 is connected to the drive shaft 202 and includes a plurality of non-reverse pins 216. The drive block includes drive notches 222 adapted to receive drive pins 223 from the bearing hub 217. A bearing hub 217 includes upper and lower ball bearing assemblies 218, 219 journalled on the drive shaft upper end 203. A clutch plate 220 is bolted to the bearing hub 217 by bolts 221.

A cooling fan 224 including blades 225 is mounted on the drive block 215 for blowing air through vents 226 in the bottom of the motor stand 211 and over the cooling fins 208. An annular fan guard 227 is mounted within the motor stand 211 above the cooling fan 224 and embodies an open, screentype design which permits the passage of air but guards against the insertion of a person's fingers into the fan 224.

The fan-cooled gear drive 200 operates in substantially the same manner as the gear drive 1. The cooling fan 224 is normally required only on gear drives designed to handle relatively large loads, for example motors and engines with power ratings in excess of 250 horsepower. However, it is anticipated that the cooling fan 224 could likewise be employed to advantage with gear drives having lower power ratings, for example even as low as the 40 to 80 horsepower range.

The cooling fan 224 is particularly effective for dissipating the heat generated by the thrust bearing assemblies 205, 206. During normal operation with a primary power source, rotating only the clutch plate 220, the cooling fan 224 is stationary along with the drive block 215 and the vertical drive shaft 202. However, when the gear drive 200 converts to a secondary power source, the drive shaft 202 is rotated along with a pinion and gear (not shown), the drive shaft 202, the drive block 215 and the other portions of the drive train and the drive gear 201. Thus, in operation with the backup power source, considerably more heat is generated in the gear drive 200 and the cooling fan 224 is employed to dissipate the heat buildup.

It is to be understood that while certain forms of the present invention have been illustrated and described herein, it is not to be limited to the specific forms or arrangement of parts described and shown.

What is claimed and desired to be secured by Letters Patent is as follows:

1. A clutch assembly, which comprises:
   (a) a rotatable drive shaft;
   (b) a drive block mounted on said drive shaft and having a drive block surface;
   (c) a clutch plate mounted on one of said drive shaft and said drive block and having a clutch plate surface;
   (d) one of said drive block and said clutch plate having a drive pin receiver open at a respective surface thereof;
   (e) the other of said drive block and said clutch plate having a notch at the respective surface thereof;
   (f) a drive pin slidably received in said drive pin receiver and having an extended position inserted in said notch and a retracted position retracted in said receiver;
   (g) said pin extending into said notch in response to forward rotation of one of said drive block and said clutch plate whereby said drive block and said clutch plate are drivingly interconnected;
   (h) said drive pin retracting into said drive pin receiver in response to forward rotation of the other of said drive block and said clutch plate whereby said drive block and said clutch plate are disengaged and free to rotate relative to each other; and
   (i) non-reverse clutch means adapted to automatically prevent reverse rotation of said drive block, and through said drive pin, prevent rotation of said clutch plate.

2. The clutch assembly according to claim 1, which includes:
   (a) said drive block having said drive pin receiver; and
   (b) said clutch plate having said notch.

3. The clutch assembly according to claim 1, which includes:
   (a) said clutch plate having said drive pin receiver; and
   (b) said drive block having said notch.

4. The clutch assembly according to claim 3, which includes:
   (a) said clutch plate including a hub mounted thereon and having said drive pin receiver.

5. The clutch assembly according to claim 4 wherein:
   (a) said drive block includes an annular surface with said notch open thereat; and
   (b) said hub includes an annular surface in opposed relation to said block annular surface, said receiver being open at said hub surface.

6. The clutch assembly according to claim 5 wherein:
   (a) said notch includes a face sustantially aligned with a rotational axis of said drive shaft and a ramp sloping from said face to said drive block annular surface.

7. The clutch assembly according to claim 1 wherein said non-reverse means comprises:
   (a) a non-reverse plate mounted in fixed, stationary relation with respect to said drive shaft; and
   (b) means for selectively connecting said drive block and said non-reverse plate.

8. The clutch assembly according to claim 7, which includes:
   (a) said non-reverse plate having an annular edge with a notch extending thereinto;
   (b) said drive block having a non-reverse pin receiver; and
   (c) a non-reverse pin reciprocably positioned within said receiver, said non-reverse pin being movable between an extended position at least partly in said notch and a retracted position.

9. The clutch assembly according to claim 1, which includes:
(a) a bearing assembly mounted between said drive shaft and said clutch plate to facilitate relative rotation therebetween.

10. A clutch assembly, which comprises:
(a) a rotatable drive shaft;
(b) a drive block drivingly connected to said drive shaft and having an annular edge defining a drive block surface;
(c) a clutch plate mounted on said drive block and having an annular edge defining a clutch plate surface;
(d) one of said drive block and said clutch plate having a drive pin receiver open at a respective surface thereof;
(e) the other of said drive block and said clutch plate having a notch at the respective surface thereof;
(f) a drive pin slidably received in said drive pin receiver and having an extended position inserted in said notch and a retracted position retracted in said receiver;
(g) said pin extending into said notch in response to forward rotation of one of said drive block and said clutch plate whereby said drive block and said clutch plate are drivingly interconnected;
(h) said drive pin retracting into said drive pin receiver in response to forward rotation of the other of said drive block and said clutch plate whereby said drive block and said clutch plate are disengaged and free to rotate relative to each other; and
(i) non-reverse clutch means, which includes:
(1) a non-reverse plate mounted in stationary, fixed relation in proximity to said drive shaft, said non-reverse plate having a non-reverse plate surface and a non-reverse notch open at said non-reverse plate surface and extending into said non-reverse plate;
(2) said drive block having a non-reverse pin receiver;
(3) a non-reverse pin slidably positioned within said non-reverse pin receiver;
(4) means for biasing said non-reverse pin to an extended position inserted in said non-reverse notch whereby reverse rotation of said drive block is prevented and, through said drive pin, reverse rotation of said clutch plate is prevented; and
(5) means for retracting said non-reverse pin into said non-reverse pin receiver whereby forward rotation of said drive block is permitted.

11. The clutch assembly according to claim 10, which includes:
(a) drive block having said drive pin receiver; and
(b) said clutch plate having said notch.

12. The clutch assembly according to claim 10, which includes:
(a) said clutch plate having said drive pin receiver; and
(b) said drive block having said notch.

13. The clutch assembly according to claim 12, which includes:
(a) said clutch plate including a hub mounted thereon and having said drive pin receiver.

14. The clutch assembly according to claim 13 wherein:

(a) said drive block includes an annular surface with said notch open thereat; and
(b) said hub includes an annular surface in opposed relation to said block annular surface, said receiver being open at said hub surface.

15. The clutch assembly according to claim 14 wherein:
(a) said notch includes a face substantially aligned with a rotational axis of said drive shaft and a ramp sloping from said face to said drive block annular surface.

16. The clutch assembly according to claim 10, which includes:
(a) a bearing assembly mounted between said drive shaft and said clutch plate to facilitate relative rotation therebetween.

17. The clutch assembly according to claim 10, which includes:
(a) a spring located within said receiver for extending said drive pin.

18. The clutch assembly according to claim 10, which includes:
(a) a plurality of said non-reverse pins and receivers therefor;
(b) said non-reverse plate having a plurality of said non-reverse notches; and
(c) the total number of said non-reverse pins and notches not being equal.

19. A combination gear drive, which includes:
(a) a case with lower, side and upper openings;
(b) a horizontal bearing carrier mounted on said case over said side opening thereof;
(c) a horizontal drive shaft with inboard and outboard ends and rotatably received in said horizontal bearing carrier;
(d) a pinion mounted on said horizontal drive shaft inboard end;
(e) lower and upper bearing assemblies connected to said case in proximity to the lower and upper openings thereof;
(f) a vertical drive shaft having upper and lower ends journalled in said bearing assemblies and an axial bore extending therethrough;
(g) a thrust bearing carrier mounted on said case over the upper opening thereof;
(h) a non-reverse plate mounted on said thrust bearing carrier and having an annular upper edge and a plurality of non-reverse notches open at said non-reverse plate upper edge, each said notch having a vertical face aligned with a rotational axis of said vertical drive shaft and a ramp sloping from said vertical face to said plate upper edge;
(i) a drive block having:
(1) a lower portion fixedly mounted on said drive shaft; and
(2) an upper portion having an annular lower edge located in opposed relation to said non-reverse plate upper edge and a plurality of radially-spaced non-reverse pin receivers open at said lower edge and extending into said drive block upper portion;
(3) an annular upper edge having a plurality of drive notches, each said notch having a vertical face substantially aligned with said drive shaft rotational axis and a ramp sloping from said vertical face to said upper edge;
(j) a plurality of non-reverse pins each slidably received in a respective non-reverse pin receiver and adapted for movement between an extended position partly inserted into a respective non-reverse plate notch and a retracted position at or above a level of said non-reverse plate upper edge;

(k) a bearing hub having:
 (1) a coaxial opening;
 (2) an annular lower edge positioned in opposed relation to said drive block upper edge; and
 (3) a plurality of drive pin receivers open at said lower edge and extending into said bearing hub;

(l) a plurality of drive pins each slidably received in a respective drive pin receiver and having an extended position positioned partly within a respective drive block notch and a retracted position at or above a level of said drive block upper edge;

(m) a plurality of drive pin springs each positioned in a respective drive pin receiver for biasing said drive pin into its extended position;

(n) said upper bearing assembly being positioned within said bearing hub;

(o) a clutch plate fixedly mounted on said bearing hub and having a coaxial clutch plate opening aligned with said vertical drive shaft bore; and (p) said extended non-reverse pins being adapted to prevent reverse rotation of said drive block and, through said drive pins, prevent reverse rotation of said clutch plate, (q) said retracted non-reverse pins being adapted to permit forward rotation of said drive block and said clutch plate.

* * * * *